United States Patent [19]
Douche et al.

[11] Patent Number: 6,005,629
[45] Date of Patent: Dec. 21, 1999

[54] SYSTEM FOR CONVERTING DIGITAL TELEVISION SIGNALS WITH INSERTION OF INTERACTIVE MENUS

[75] Inventors: Jean-Louis Douche, Gieres; Alain Artieri, Meylan; Michel Imbert, Voiron, all of France

[73] Assignee: SGS-Thomson Microelectronics S.A., Saint Genis, France

[21] Appl. No.: 08/863,669

[22] Filed: May 27, 1997

[30] Foreign Application Priority Data

May 29, 1996 [FR] France ................................. 96 06829

[51] Int. Cl.$^6$ ..................................................... H04N 5/44
[52] U.S. Cl. ........................... 348/423; 348/441; 348/659; 348/469; 348/600; 370/535; 370/916
[58] Field of Search ....................... 348/423, 845, 348/845.1, 845.2, 845.3, 441, 445, 450, 385, 386, 387, 705, 706, 659, 660, 661, 469, 600, 473; 370/535, 916; H04N 5/44

[56] References Cited

U.S. PATENT DOCUMENTS

| 5,301,028 | 4/1994 | Banker et al. | 348/570 |
|---|---|---|---|
| 5,438,370 | 8/1995 | Primiano et al. | 348/476 |
| 5,493,339 | 2/1996 | Birch et al. | 348/461 |
| 5,497,187 | 3/1996 | Banker et al. | 348/6 |
| 5,519,450 | 5/1996 | Urbanus et al. | 348/600 |
| 5,521,922 | 5/1996 | Fujinami et al. | 348/423 |
| 5,534,942 | 7/1996 | Beyers, Jr. et al. | 348/569 |
| 5,559,808 | 9/1996 | Kostreski et al. | 348/385 |
| 5,654,758 | 8/1997 | Taylor et al. | 348/385 |
| 5,663,962 | 9/1997 | Caire et al. | 370/535 |
| 5,708,664 | 1/1998 | Budge et al. | 348/385 |
| 5,742,361 | 4/1998 | Nakase et al. | 348/423 |
| 5,742,732 | 4/1998 | Kubo et al. | 348/423 |

FOREIGN PATENT DOCUMENTS

| 0 596 732 | 11/1994 | European Pat. Off. | H04N 5/262 |
|---|---|---|---|
| WO-A-95 33338 | 12/1995 | WIPO | H04N 7/173 |

OTHER PUBLICATIONS

The IEEE Standard Dictionary of Electrical and Electronics Terms, Sixth Edition, pp. 270 and 673, Apr. 8, 1997.

*Primary Examiner*—Michael H. Lee
*Assistant Examiner*—Jean W. Désir
*Attorney, Agent, or Firm*—Wolf, Greenfield & Sacks, P.C.

[57] ABSTRACT

A system for converting digital television signals encoded according to an MPEG standard into standardized analog video signals. The system includes means for generating graphic images and for inserting corresponding image signals in a decoded digital flow of main image signals, a digital decoding unit, and an analog coding unit. The digital decoding unit includes means for providing a flow of multiplexed image signals including a first flow of main image signals and of a second flow of image signals that contains, in addition to the main image signals, possible graphic image signals. The analog coding unit includes a demultiplexer of the flow of multiplexed image signals and two encoders. The two encoders respectively receive the first and second flows, and each respectively provide a digital flow of images encoded according to a color television standard to digital-to-analog converters respectively associated therewith, the digital-to-analog converters providing the standardized analog video signals.

14 Claims, 2 Drawing Sheets

SYSTEM FOR CONVERTING DIGITAL TELEVISION SIGNALS WITH INSERTION OF INTERACTIVE MENUS

BACKGROUND OF THE INVENTION

1. Field of the Invention

The present invention relates to the reception of digital television signals transmitted, for example, by a cable network or a satellite. Such television signals require a conversion system to adapt the digital signals to the standardized analog input signals of a television set. The analog input signals of a television set include at least one of signals providing the intensity of each primary color (RGB), or signals providing a composite video signal (CVBS), or separate luminance signals Y and chrominance signals C, the separate luminance and chrominance signals being the signals used for some video tape recorders, particularly S-VHS video tape recorders.

2. Discussion of the Related Art

Digital television signals generally are coded, on the transmit side, according to a data compression process in order to minimize the amount of digital data to be transmitted. This compression is standardized (MPEG). On the receive side, the images are thus generally decompressed in a digital form before being coded according to a color television standard (PAL, NTSC, SECAM) and converted into analog signals. These transformations are generally performed within a conversion system.

FIG. 1 shows, in the form of a block-diagram, an example of a conventional conversion system. Digital television signals transmitted by a satellite reception antenna (not shown) or by a cable network are sent, after a first analog demodulation of the channel frequency and a second demodulation, of the QAM type (quadrature amplitude modulation) for the cable network and of the QPSK type (quadrature phase skip modulation) for the satellite, to an input E of a digital unit 1 of the conversion system. This unit 1 essentially includes a decoder (MPEG-DEC) 2 that receives the digital signals coded according to an MPEG standard and received by input E. Decoder 2 reads out a digital image data flow I.

Unit 1 further generally includes a circuit (OSD-GEN) 3 for generating graphic elements to be inserted in the image data flow. These graphic elements generally correspond to interactive menus, called by means of a remote control, that enable the user to set certain operating parameters of the television set and its receive unit. These can be, for example, settings of the receive channels, settings of the satellite reception dishpan, sound or contrast settings, etc. The signals relative to these graphic elements are generated in a digital form by circuit 3 in a format compatible with that of unit 1, that is, with digital image flow I. These signals are generally called "On screen display" signals, or OSD signals. The OSD signals are inserted in image flow I by means of a mixer (MIX) 4, an output S of which provides a digital image flow resulting from the mixing of the main images I supplied by decoder 2 and the OSD signals. Generator 3 and decoder 2 generally share a same memory (MEM) 5 associated with digital unit 1.

Digital image flow S is then sent to a unit 6 for coding the signals into analog signals which conform with the PAL, SECAM or NTSC color television standards. Unit 6 essentially includes a coding circuit 7 and digital-to-analog converters 8 which transpose flow S into analog CVBS and/or R, G, B and/or Y, C, video signals. The signals provided by unit 6 are used by the television set to display the images.

Some of these signals may also be used to record television programs, for example, on a video tape recorder. When this is the case, the presence of OSD signals inside image flow S is problematic because these OSD signals are then present on all the analog outputs of conversion unit 6 and thus are recorded on the tape of the video tape recorder. Thus, the recording of the television programs is disturbed by any calling of a menu by the user by means of the remote control. Accordingly, it is not possible to check or modify settings during a recording.

To overcome this disadvantage, it is conventionally required to use two digital decoding units and two coding units such as described with respect to FIG. 1 within the conversion system. FIG. 2 shows an example of a conventional conversion system of this type. The conversion system includes two digital units for decoding according to an MPEG standard, respectively units 10 and 20. Each unit 10 or 20 receives a same flow of digital television signals as an input, respectively signals E1 or E2. Units 10 and 20 have substantially the same structure as digital unit 1 of FIG. 1. Thus, they each include an MPEG decoder (MPEG-DEC), respectively 12 or 22, an OSD signal generator (OSD-GEN), respectively 13 or 23, a mixer (MIX), respectively 14 or 24, and a memory (MEM), respectively 15 or 25.

Each unit 10 or 20 is associated with a coding unit, respectively 16 or 26, for converting the digital image flows, respectively S1 and S2, provided by units 10 and 20 into standardized analog video signals. Units 16 and 26 are shown in FIG. 2 by a simple block; each unit 16 and 26 being identical to the unit 6 shown in FIG. 1.

Unit 10 and unit 16 generate analog video signals including, when necessary, OSD signals inserted in the flow I of main images. The operation of units 10 and 16 is identical to the operation of units 1 and 6 described with respect to FIG. 1. Units 20 and 26 generate analog video signals free of OSD signals. Generator 23 of unit 20 is thus unused. Similarly, only outputs CVBS2, Y2, and C2 of unit 26 are used since the outputs R, G, and B of a coding circuit are generally not used for the recording of video images on a video tape recorder.

Two possibilities are thus available for signals CVBS, Y, and C, a first possibility (CVBS1, Y1, C1) including, when necessary, OSD signals for the displaying of interactive menus on the television set, and the second possibility (CVBS2, Y2, and C2) including the flow of main images only. A disadvantage of the conversion system such as shown in FIG. 2 is that it requires four circuits 10, 16, 20, and 26, which are generally integrated. The cost of the system is then substantially doubled with respect to a system such as shown in FIG. 1.

SUMMARY OF THE INVENTION

It is an object of the present invention to provide a new architecture for a system that converts digital television signals into standardized analog television signals which avoids the disturbance of possible video recordings by OSD signals likely to be inserted in a flow of main images. It is also an object of the present invention to provide a simple and inexpensive architecture.

To achieve the afore-mentioned objects, the present invention provides a system for converting digital television signals coded according to an MPEG standard into standardized analog video signals. The system includes means for generating graphic images and for inserting corresponding image signals in a decoded digital flow of main images, a digital decoding unit and a coding unit. The digital decoding unit receives the signals coded according to an MPEG standard and includes means for providing a flow of multiplexed images including a first flow of main images and a second flow of images containing, in addition to the main images, possible graphic image signals. The coding unit includes a demultiplexer of the flow of multiplexed images and two encoders that respectively receive the first and second flows. The two encoders each provide a respective digital flow of images coded according to a color television standard to respective digital-to-analog converters, the respective digital-to-analog converters providing the standardized analog video signals.

According to an embodiment of the present invention, the digital decoding unit includes a decoder of signals coded according to an MPEG standard, a generator of graphic image signals, a mixer, and a multiplexer. The mixer receives digital signals provided by the decoder and the generator and provides a digital flow of images, in which the possible graphic image signals are inserted in the flow of main images. The multiplexer receives the flow of main images provided by the decoder and the flow of images provided by the mixer.

According to another embodiment of the present invention, the coding unit includes circuitry grouping functions which are common to the two encoders.

According to a further embodiment of the present invention, the circuitry that groups functions common to the two encoders provides at least two signals, including clock and chrominance subcarrier signals, which are common to the two encoders. According to a still further embodiment of the present invention, sampling frequencies of the multiplexer and the demultiplexer correspond to twice a control frequency of the mixer.

BRIEF DESCRIPTION OF THE DRAWINGS

These objects, characteristics and advantages, as well as others, of a preferred embodiment of the present invention, are described by way of example with reference to the accompanying drawings, in which.

DETAILED DESCRIPTION

Figure 1:
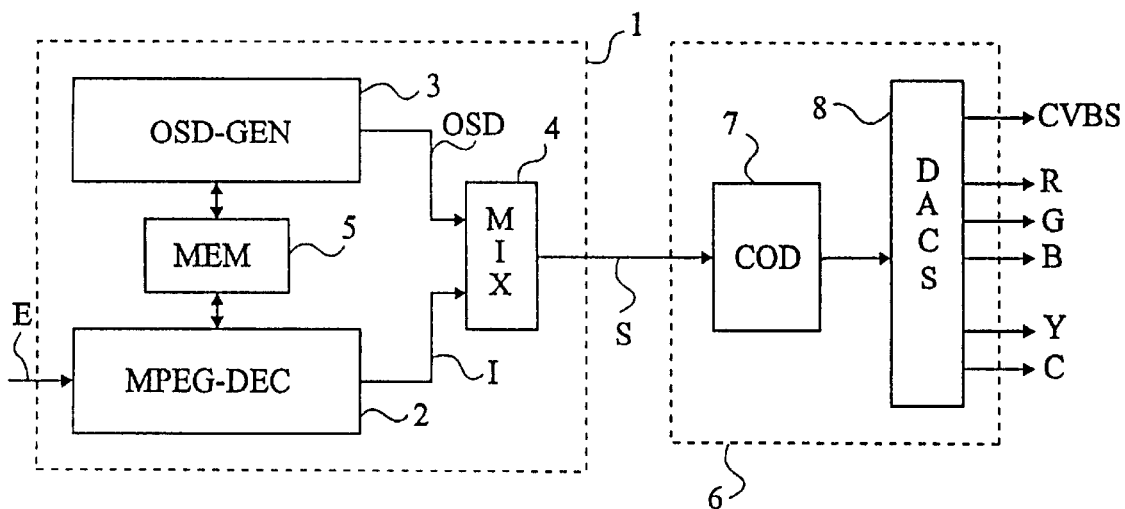
FIG. 1 is a block diagram of a conventional conversion system including a digital decoding unit and a coding unit.
Figure 2:
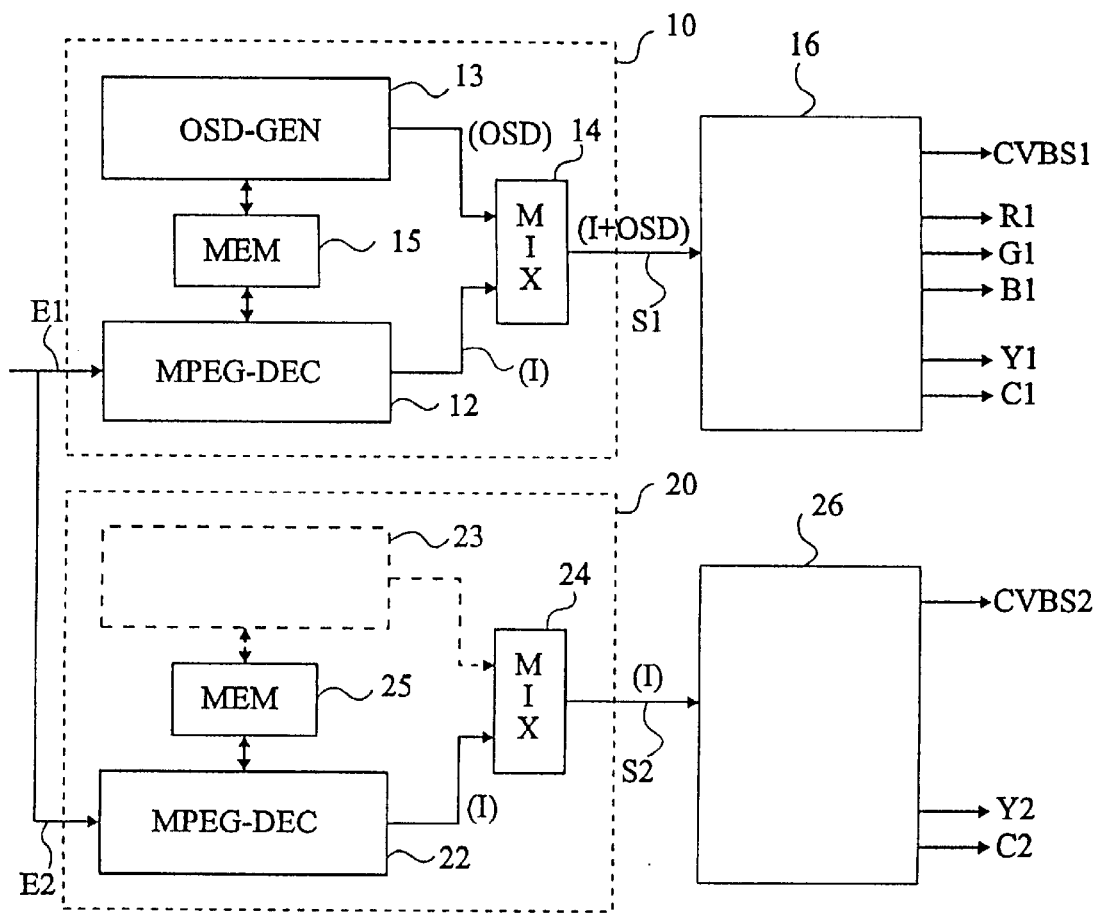
FIG. 2 is a block diagram of a conventional conversion system including two digital decoding units and two coding units.

For clarity, only those components necessary for the understanding of the present invention are shown in the drawings and described hereafter.

Figure 3:
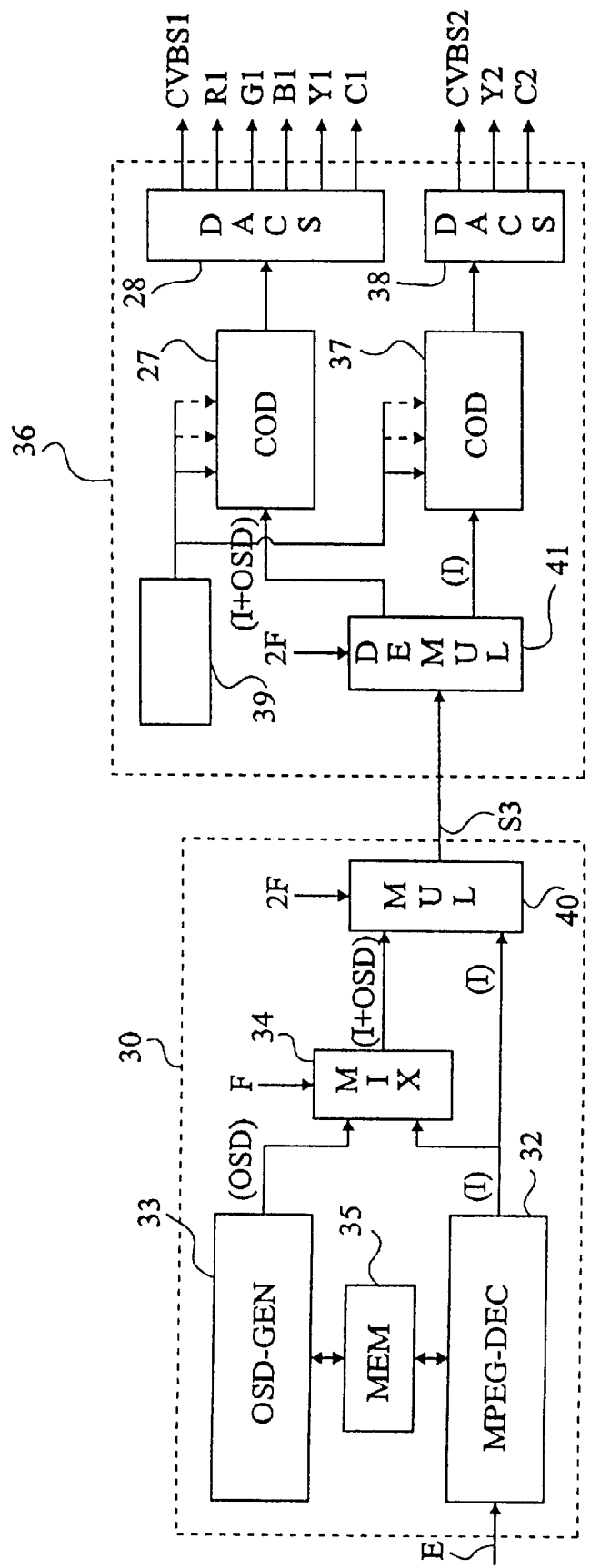
FIG. 3 is a block diagram of a conversion system according to an embodiment of the present invention.

FIG. 3 shows an embodiment of the present invention. According to an embodiment of the present invention, the conversion system includes a first digital unit 30 which receives, on an input E, digital television signals coded according to an MPEG standard and provided by, for example, a satellite reception antenna or a cable network (not shown). Unit 30 includes an MPEG decoder (MPEG-DEC) 32, an OSD signal generator (OSD-GEN) 33, a mixer (MIX) 34 and a memory (MEM) 35. Unit 30 also includes a multiplexer (MUL) 40 which receives, on two respective inputs the mixed flow (I+OSD) provided by mixer 34 and the flow of main images (I) provided by decoder 32, respectively. Thus, the output of multiplexer 40 which constitutes the output S3 of unit 30 provides a multiplexed flow of digital images containing both an image flow (I+OSD) in which the OSD signals are inserted, when necessary, and the flow of main images only (I). An advantage of using a multiplexer is that it minimizes the number of pins of the integrated circuit. In order not to disturb the image transmission rate, the sampling frequency of multiplexer 40 is equal to double frequency F of mixer 34. Although sampling frequency 2F of multiplexer 40 can be provided by a clock which is separate from that supplying frequency F, it is preferred, according to a preferred embodiment of the present invention, to use the two edges of the clock signal at frequency F to control multiplexer 40. The use of an additional clock signal generator is thus avoided.

Unit 30 is associated with a coding unit 36. Unit 36 receives the flow of multiplexed images at frequency 2F. According to an embodiment of the present invention, the unit 30 includes a demultiplexer (DEMUL) 41, the sampling frequency of which is frequency 2F. Two outputs of demultiplexer 41 thus respectively provide, at frequency F, a flow (I+OSD) of images containing, when necessary, OSD signals, and a flow (I) of main images only, respectively.

Unit 36 includes two digital signal encoders according to the PAL and/or SECAM and/or NTSC color television standards, respectively 27 and 37. Encoders 27 and 37 are respectively associated with digital-to-analog converters (DACS), 28 and 38, respectively. Converters 28 provide analog video signals CVBS1, R1, G1, B1, Y1, and C1 which include, when necessary, interactive menus inserted in the images. These signals are meant for display on the television set. Converters 38 provide analog video signals CVBS2, Y2, and C2 which only include the main images and which are thus meant, for example, for a video tape recorder. An advantage of the present invention is that it avoids the use of two digital units for decoding according to an MPEG standard.

Preferably, certain functions of coding circuits 27 and 37 are grouped within a same block 39. Indeed, circuits 27 and 37 operate at the same frequency F and they can thus share, in particular, the same time base, the same chrominance subcarrier generator, the same synchronization pulse generator, the same possible subtitling signal generator, the same possible signal encryption system, and the same control bus decoding circuit which are grouped in common block 39. This enables the double encoding function implemented by unit 36 to be optimized by minimizing the number of required circuits. Functions which are present in each circuit 27 or 37 are, according to the present invention, the chrominance and luminance filtering, the chrominance modulator, and the luminance and chrominance adder.

Thus, the present invention allows the provision of both an image flow containing, when necessary, OSD signals and a flow of main images only, without increasing the number of required integrated circuits and connections with respect to a conversion system such as shown in FIG. 1.

Of course, the present invention is likely to have various alterations, modifications, and improvements which will readily occur to those skilled in the art. In particular, the practical implementation of the digital and coding units is within the abilities of those skilled in the art based on the functional indications given herabove. Such alterations, modifications, and improvements are intended to be within the spirit and the scope of the present invention. Accordingly, the foregoing description is by way of example only and is not intended as limiting. The present invention is limited only as defined in the following claims and the equivalents thereto.

What is claimed is:

1. A conversion system for converting digital television signals encoded according to an MPEG standard into standardized analog video signals and including means for generating graphic images and for inserting the graphic images in a decoded digital flow of main images, the system comprising:

a digital decoding unit to receive the signals encoded according to the MPEG standard, the digital decoding unit including means for providing a flow of multiplexed image signals that includes a first flow of main image signals corresponding to the flow of main images and a second flow of image signals that contains both signals corresponding to the flow of main images and graphic image signals corresponding to the graphic images; and a coding unit including a demultiplexer to demultiplex the flow of multiplexed image signals and two encoders to respectively receive first and second demultiplexed flows from the demultiplexer and provide respective digital flows of images encoded according to a color television standard to respective digital-to-analog converters that provide the standardized analog video signals;

wherein the coding unit includes circuitry grouping functions which are common to the two encoders.

2. A conversion system according to claim 1, wherein the circuitry grouping functions common to the two encoders provides at least a clock signal and a chrominance subcarrier signal which are common to the two encoders.

3. A conversion system for converting digital television signals encoded according to an MPEG standard into standardized analog video signals and including means for generating graphic images and for inserting the graphic images in a decoded digital flow of main images, the system comprising:

a digital decoding unit to receive the signals encoded according to the MPEG standard, the digital decoding unit including means for providing a flow of multiplexed image signals that includes a first flow of main image signals corresponding to the flow of main images and a second flow of image signals that contains both signals corresponding to the flow of main images and graphic image signals corresponding to the graphic images; and a coding unit including a demultiplexer to demultiplex the flow of multiplexed image signals and two encoders to respectively receive first and second demultiplexed flows from the demultiplexer and provide respective digital flows of images encoded according to a color television standard to respective digital-to-analog converters that provide the standardized analog video signals;

wherein the digital decoding unit includes
a decoder of the signals encoded according to the MPEG standard to provide the first flow of main image signals,
a generator of the graphic image signals,
a mixer, coupled to the decoder and the generator to receive the first flow of main image signals from the decoder and the graphic image signals generated by the generator and provide the second flow of image signals, and
a multiplexer, coupled to the mixer and the decoder, to receive the first flow of main image signals and the second flow of image signals and provide the flow of multiplexed image signals; and wherein a sampling frequency of the multiplexer and of the demultiplexer correspond to twice a control frequency of the mixer.

4. A circuit to receive a flow of MPEG encoded images and provide a plurality of video signals, comprising:

a decoding unit to receive the flow of MPEG encoded images and provide a decoded output signal, the decoded output signal including a first signal that includes a flow of decoded images corresponding to the flow of MPEG encoded images and a second signal that includes the flow of decoded images in addition to a flow of graphic images; and an encoding unit to receive the decoded output signal and provide the plurality of video signals encoded according to a color television standard encoding, the plurality of video signals including a third signal corresponding to the flow of decoded images and a fourth signal corresponding to the flow of decoded images in addition to the flow of graphic images;

wherein the decoding unit includes
an MPEG decoder that receives the flow of MPEG encoded images and decodes the flow of MPEG encoded images to provide the flow of decoded images,
a signal generator that provides the flow of graphic images,
a mixer, coupled to the MPEG decoder and the signal generator, that receives the flow of decoded images and the flow of graphic images and inserts the flow of graphic images into the flow of decoded images to provide the flow of decoded images in addition to the flow of graphic images, and
a multiplexer, coupled to the mixer and the MPEG decoder, that receives the flow of decoded images and the flow of decoded images in addition to the flow of graphic images and multiplexes the flow of decoded images and the flow of decoded images in addition to the flow of graphic images to provide the decoded output signal;

wherein the encoding unit includes
a demultiplexer, coupled to the multiplexer, that receives the decoded output signal and demultiplexes the flow of decoded images from the flow of decoded images in addition to the flow of graphic images,
a first encoder, coupled to the demultiplexer, that receives the flow of decoded images from the demultiplexer, encodes the flow of decoded images according to the color television standard encoding, and provides the third signal, and
a second encoder, coupled to the demultiplexer, that receives the flow of decoded images in addition to the flow of graphic images from the demultiplexer, encodes the flow of decoded images in addition to the flow of graphic images according to the color television standard encoding, and provides the fourth signal; and wherein the first encoder and the second encoder share circuitry that is common to both the first and second encoders, the circuitry including at least one of a chrominance subcarrier generator, a synchronization pulse generator, a subtitling signal generator, and a signal encryption system.

5. The circuit of claim 4, wherein:
the mixer, the multiplexer, and the demultiplexer each has a sampling frequency;

the mixer, the multiplexer, and the demultiplexer each receive a clock signal having a pair of edges;

the sampling frequency of the mixer is provided by a first edge of the pair of edges of the clock signal; and the sampling frequency of the multiplexer and the sampling frequency of the demultiplexer is provided by the pair of edges of the clock signal.

6. A circuit to receive a flow of MPEG encoded images and provide a plurality of video signals, comprising:

a decoding unit to receive the flow of MPEG encoded images and provide a decoded output signal, the decoded output signal including a first signal that includes a flow of decoded images corresponding to the flow of MPEG encoded images and a second signal that includes the flow of decoded images in addition to a flow of graphic images; and an encoding unit to receive the decoded output signal and provide the plurality of video signals encoded according to a color television standard encoding, the plurality of video signals including a third signal corresponding to the flow of decoded images and a fourth signal corresponding to the flow of decoded images in addition to the flow of graphic images;

wherein the decoding unit includes an MPEG decoder that receives the flow of MPEG encoded images and decodes the flow of MPEG encoded images to provide the flow of decoded images, a signal generator that provides the flow of graphic images, a mixer, coupled to the MPEG decoder and the signal generator, that receives the flow of decoded images and the flow of graphic images and inserts the flow of graphic images into the flow of decoded images to provide the flow of decoded images in addition to the flow of graphic images, and a multiplexer, coupled to the mixer and the MPEG decoder, that receives the flow of decoded images and the flow of decoded images in addition to the flow of graphic images and multiplexes the flow of decoded images and the flow of decoded images in addition to the flow of graphic images to provide the decoded output signal; and wherein the mixer and the multiplexer each has a sampling frequency, and the sampling frequency of the multiplexer is twice the sampling frequency of the mixer.

7. The circuit of claim 6, wherein:

the mixer and the multiplexer each receive a clock signal having a pair of edges;

the sampling frequency of the mixer is provided by a first edge of the pair of edges of the clock signal; and the sampling frequency of the multiplexer is provided by the pair of edges of the clock signal.

8. A circuit to receive a flow of MPEG encoded images and provide a plurality of video signals, comprising:

a decoding unit to receive the flow of MPEG encoded images and provide a decoded output signal, the decoded output signal including a first signal that includes a flow of decoded images corresponding to the flow of MPEG encoded images and a second signal that includes the flow of decoded images in addition to a flow of graphic images; and an encoding unit to receive the decoded output signal and provide the plurality of video signals encoded according to a color television standard encoding, the plurality of video signals including a third signal corresponding to the flow of decoded images and a fourth signal corresponding to the flow of decoded images in addition to the flow of graphic images;

wherein the encoding unit includes a demultiplexer that receives the decoded output signal and demultiplexes the flow of decoded images from the flow of decoded images in addition to the flow of graphic images, a first encoder, coupled to the demultiplexer, that receives the flow of decoded images from the demultiplexer and encodes the flow of decoded images according to the color television standard encoding to provide the third signal, and a second encoder, coupled to the demultiplexer, that receives the flow of decoded images in addition to the flow of graphic images from the demultiplexer and encodes the flow of decoded images in addition to the flow of graphic images according to the color television standard encoding to provide the fourth signal; and wherein the first encoder and the second encoder share circuitry that is common to both the first and second encoders.

9. The circuit of claim 8, wherein the circuitry that is common to both the first and second encoders includes at least one of a chrominance subcarrier generator, a synchronization pulse generator, a subtitling signal generator, and a signal encryption system.

10. A circuit to receive a flow of MPEG encoded images and provide a single decoded output signal, comprising:

an MPEG decoder to receive the flow of MPEG encoded images and decode the flow of MPEG encoded images to provide a first signal corresponding to the flow of MPEG encoded images;

a signal generator to provide a flow of graphic images;

a mixer, coupled to the MPEG decoder and the signal generator, to receive the first signal and insert the flow of graphic images into the first signal to provide a second signal corresponding to the flow of MPEG encoded images in addition to the flow of graphic images; and a multiplexer, coupled to the mixer and the MPEG decoder, to receive the first and second signals and multiplex the first and second signals into the single decoded output signal; wherein:

the mixer and the multiplexer each receives a clock signal having a pair of edges;

a sampling frequency of the mixer is provided by a first edge of the pair of edges of the clock signal; and a sampling frequency of the multiplexer is provided by the pair of edges of the clock signal.

11. A circuit to receive an input signal and provide a plurality of encoded video signals corresponding to the input signal, the circuit comprising:

a demultiplexer to receive the input signal and separate the input signal into a first signal and a second signal, the first signal corresponding to a flow of images and the second signal corresponding to the flow of images in addition to a flow of graphic images;

a first encoder, coupled to the demultiplexer, to receive the first signal from the demultiplexer and encode the flow of images according to a color television standard encoding to provide a first encoded video signal of the plurality of encoded video signals; and a second encoder, coupled to the demultiplexer, to receive the second signal from the demultiplexer and encode the flow of images in addition to the flow of graphic images according to the color television standard encoding to provide a second encoded video signal of the plurality of encoded video signals;

wherein the first encoder and the second encoder share circuitry that is common to both the first and second encoders.

12. The circuit of claim 11, wherein the circuitry that is common to both the first and second encoders includes at least one of a chrominance subcarrier generator, a synchronization pulse generator, a subtitling signal generator, and a signal encryption system.

13. A method of decoding a flow of MPEG encoded images, comprising the steps of:

receiving the flow of MPEG encoded images;

decoding the flow of MPEG encoded images to provide a first flow of decoded images corresponding to the flow of MPEG encoded images;

generating a graphical image;

inserting the graphical image into the flow of decoded images to provide a second flow of decoded images corresponding to the flow of MPEG encoded images and the graphical image;

combining the first flow and the second flow into a single signal that includes both the first flow of decoded images and the second flow of decoded images;

receiving the single signal;

separating the first flow of decoded images from the second flow of decoded images;

encoding, according to a color television standard encoding, the first flow of decoded images in a first encoder to provide a first encoded output signal; and encoding, according to the color television standard encoding, the second flow of decoded images in a second encoder to provide a second encoded output signal;

wherein the steps of encoding the first and second flows includes a step of sharing circuitry that is common to the first and second encoder to provide the first and second encoded output signals.

14. A circuit to receive a flow of MPEG encoded images and provide a plurality of encoded signals that are encoded according to a color television standard encoding, the circuit comprising:

an MPEG decoder to receive and decode the flow of MPEG encoded images and provide a flow of decoded images corresponding to the flow of MPEG encoded images;

a signal generator to provide a flow of graphic images;

first means, coupled to the MPEG decoder and the signal generator, for combining the flow of decoded images and the flow of decoded images in addition to the flow of graphic images into a single signal; and second means, coupled to the first means, for receiving the single signal and encoding the flow of decoded images and the flow of decoded images in addition to the flow of graphic images into respective encoded signals of the plurality of encoded signals;

wherein the second means includes means for separating the flow of decoded images from the flow of decoded images in addition to the flow of graphic images, first encoding means, coupled to the means for separating, for encoding the flow of decoded images into a first of the respective encoded signals, second encoding means, coupled to the means for separating, for encoding the flow of decoded images in addition to the flow of graphic images into a second of the respective encoded signals, and common encoding means, coupled to the first and second encoding means, for performing encoding functions that are common to both the first and second encoding means.

* * * * *